United States Patent
Marshall

(10) Patent No.: US 12,523,868 B2
(45) Date of Patent: Jan. 13, 2026

(54) WAVEGUIDE STRUCTURE

(71) Applicant: Snap Inc., Santa Monica, CA (US)

(72) Inventor: Ian Marshall, Rochester (GB)

(73) Assignee: Snap Inc., Santa Monica, CA (US)

( * ) Notice: Subject to any disclaimer, the term of this patent is extended or adjusted under 35 U.S.C. 154(b) by 625 days.

(21) Appl. No.: 17/822,591

(22) Filed: Aug. 26, 2022

(65) Prior Publication Data

US 2022/0413283 A1 Dec. 29, 2022

Related U.S. Application Data

(63) Continuation of application No. 16/483,286, filed as application No. PCT/GB2018/050355 on Feb. 8, 2018, now Pat. No. 11,460,694.

(30) Foreign Application Priority Data

Feb. 14, 2017 (EP) .................................... 17275017
Feb. 14, 2017 (GB) .................................... 1702353

(51) Int. Cl.
G02B 27/01 (2006.01)
G02B 27/00 (2006.01)
G02B 27/42 (2006.01)

(52) U.S. Cl.
CPC ..... *G02B 27/0081* (2013.01); *G02B 27/0103* (2013.01); *G02B 27/0172* (2013.01); *G02B 27/4277* (2013.01)

(58) Field of Classification Search
None
See application file for complete search history.

(56) References Cited

U.S. PATENT DOCUMENTS

| 8,355,610 | B2 | 1/2013 | Simmonds |
| 8,493,662 | B2 | 7/2013 | Noui |
| 11,320,571 | B2* | 5/2022 | Brown ................. G02B 6/0076 |
| 11,460,694 | B2 | 10/2022 | Marshall |
| 2010/0246003 | A1 | 9/2010 | Simmonds et al. |

(Continued)

FOREIGN PATENT DOCUMENTS

| EP | 3361147 | 8/2018 |
| EP | 2373924 | 2/2019 |

(Continued)

OTHER PUBLICATIONS

"U.S. Appl. No. 16/483,286, Examiner Interview Summary mailed Mar. 24, 2022", 3 pgs.

(Continued)

*Primary Examiner* — Derek S. Chapel
(74) *Attorney, Agent, or Firm* — Schwegman Lundberg & Woessner, P.A.

(57) ABSTRACT

An optical waveguide device for use in a head up display. The waveguide device provides pupil expansion in two dimensions. The waveguide device comprises a primary waveguide and a secondary waveguide, the secondary waveguide being positioned on a face of the primary waveguide. The secondary waveguide has a diffraction grating on a face opposite to the face which contacts the primary waveguide. The diffraction grating diffracts light into more than one diffraction order. Rays diffracted into a non-zero order are trapped in the secondary waveguide by total internal reflection.

19 Claims, 13 Drawing Sheets

(56) References Cited

U.S. PATENT DOCUMENTS

| | | | |
|---|---|---|---|
| 2010/0246004 A1 | 9/2010 | Simmonds | |
| 2011/0026128 A1 | 2/2011 | Baker et al. | |
| 2011/0235179 A1 | 9/2011 | Simmonds | |
| 2011/0242661 A1 | 10/2011 | Simmonds | |
| 2011/0242670 A1 | 10/2011 | Simmonds | |
| 2015/0086163 A1 | 3/2015 | Valera et al. | |
| 2016/0231569 A1 | 8/2016 | Levola | |
| 2018/0052501 A1* | 2/2018 | Jones, Jr. | G02B 6/0076 |
| 2018/0082644 A1* | 3/2018 | Bohn | G02B 6/003 |
| 2018/0143509 A1* | 5/2018 | Oh | G02B 6/0076 |
| 2019/0324278 A1 | 10/2019 | Simmonds et al. | |
| 2020/0012093 A1 | 1/2020 | Marshall | |
| 2020/0278543 A1* | 9/2020 | Schultz | G02B 6/005 |

FOREIGN PATENT DOCUMENTS

| | | |
|---|---|---|
| GB | 2561944 | 10/2018 |
| JP | 2017090561 A | 5/2017 |
| WO | WO-2007141589 A1 | 12/2007 |
| WO | WO-2008038058 A1 | 4/2008 |
| WO | WO-2008081070 A1 | 7/2008 |
| WO | WO-2009127849 A1 | 10/2009 |
| WO | WO-2010067114 A1 | 6/2010 |
| WO | WO-2018150163 A1 | 8/2018 |

OTHER PUBLICATIONS

"U.S. Appl. No. 16/483,286, Non Final Office Action mailed Jan. 28, 2022", 18 pgs.
"U.S. Appl. No. 16/483,286, Notice of Allowance mailed May 19, 2022", 8 pgs.
"U.S. Appl. No. 16/483,286, Notice of Non-Compliant Amendment mailed May 4, 2022", 2 pgs.
"U.S. Appl. No. 16/483,286, Preliminary Amendment filed Aug. 2, 2019", 6 pgs.
"U.S. Appl. No. 16/483,286, Response filed Apr. 28, 2022 to Non Final Office Action mailed Jan. 28, 2022", 13 pgs.
"U.S. Appl. No. 16/483,286, Response filed May 4, 2022 to Notice of Non-Compliant Amendment mailed May 4, 2022", 4 pgs.
"European Application Serial No. 17275017.6, Extended European Search Report mailed Jul. 25, 2017", 7 pgs.
"International Application Serial No. PCT/GB2018/050355, International Preliminary Report on Patentability mailed Aug. 29, 2019", 7 pgs.
"International Application Serial No. PCT/GB2018/050355, International Search Report mailed May 11, 2018", 4 pgs.
"International Application Serial No. PCT/GB2018/050355, Written Opinion mailed May 11, 2018", 5 pgs.
"The use of optical waveguides in Head Up Display (HUD) applications", SPIE—International Society For Optical Engineering Proceedings, vol. 8736, (May 22, 2013), 14 pgs.
"United Kingdom Application Serial No. 1702353.2, Search Report under Section 17(5) mailed Jun. 27, 2017", 3 pgs.
"European Application Serial No. 18704293.2, Communication Pursuant to Article 94(3) EPC mailed Nov. 12, 21", 7 pgs.
"United Kingdom Application Serial No. 1802045.3, Combined Search and Examination Report under Sections 17 and 18(3) mailed Aug. 28, 2018", 6 pgs.
"United Kingdom Application Serial No. 1802045.3, Office Action mailed Dec. 18, 2019", 2 pgs.
"United Kingdom Application Serial No. 1802045.3, Response filed Feb. 12, 2019 to Office Action mailed Aug. 28, 2018", 6 pgs.
"European Application Serial No. 23206277.8, Extended European Search Report mailed Feb. 12, 2024", 8 pgs.
"European Application Serial No. 23206277.8, Invitation pursuant to Article 94(3) and Rule 71(1) EPC mailed Jul. 30, 2025", 4 pgs.
"European Application Serial No. 23206277.8, Response filed Jul. 15, 24 to Extended European Search Report mailed Feb. 12, 2024", 6 pgs.
"European Application Serial No. 23206277.8, Response filed Sep. 16, 2025 to Invitation pursuant to Article 943 and Rule 711 EPC mailed Jul. 30, 2025", 10 pgs.

* cited by examiner

WAVEGUIDE STRUCTURE

This application is a continuation of U.S. patent application Ser. No. 16/483,286, filed 2 Aug. 2019, which is a U.S. national-phase application filed under 35 U.S.C. § 371 from International Application Serial No. PCT/GB2018/050355, filed 8 Feb. 2018, and published as WO 2018/150163 on 23 Aug. 2018, which claims the benefit of priority to GB Application Serial No. 1702353.2, filed 14 Feb. 2017, and EP Application Serial No. 17275017.6, also filed 14 Feb. 2017.

This disclosure relates to optical waveguides and is particularly, but not exclusively, relevant to optical waveguides for head up displays.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user. This may be accomplished utilising a waveguide system as shown schematically in cross section in FIG. 1.

Waveguide body 10 is formed from an optically transmissive material which propagates light at the required wavelengths. Waveguide 10 is a piece of glass or other optically transmissive material with parallel faces which traps a light beam within the waveguide. Waveguides utilising refracting and reflecting surfaces to inject the light beam into the waveguide, to propagate it within the waveguide, and/or to project it out from the waveguide are generally known as prismatic waveguides. Waveguides using diffraction gratings for these functions are generally known as holographic waveguides. FIG. 1 is an example of a prismatic waveguide.

In the case of a prismatic waveguide, Projector 11 projects an image into the waveguide 10, via input optics 12 and input coupling device 13. Input optics 12 are arranged to distribute the projected image over an input pupil of input coupling device 13. The near-field of that pupil represents the distribution of light across the pupil, while the far field represents the image information. It is desirable for the image (far field) displayed to the user to be focussed a long way from the eye, which will be referred to as infinity. The waveguide system is arranged to preserve ray direction between the input pupil and an output pupil (through which the image is viewed), and accordingly the input optics 12 are arranged to focus the image (far field) at infinity at the input pupil. Therefore, at the input pupil each pixel of the image is represented by a bundle of parallel rays distributed across the input pupil. Each pixel of the image is represented by a bundle of rays at unique angles. Once focussed onto the retina of the user, by an eye lens focussed at infinity, the projected image is recreated.

For clarity, the rays propagating through the waveguide system are represented by a single ray 14, but as will be appreciated this represents a number of bundles of parallel rays distributed over an area, with each bundle propagating at a different angle.

Input coupling device 13 couples the ray 14 into waveguide body 10. The rays enter input coupling device 13 at an angle that allows transmission or reflection of ray 14 into the waveguide 10. The rays are refracted or reflected, or a combination of both processes, by input coupling device 13, such that they are trapped in the waveguide 10 by total internal reflection at the top and bottom faces. Output coupling device 15 refracts light back to its original angles and the ray exits the waveguide. The output coupling device 15 is arranged to counteract and compensate any colour dependent variations of the angle of ray 14 within the waveguide that are introduced by the input device 13.

As at the input, the output light is distributed over an output pupil. For optimum performance, the waveguide system should preserve the far-field (ray angles) of the light between the input and output pupils, and provide a uniform distribution of intensity across the output pupil, which is called the near field.

The device of FIG. 1 utilises refractive prisms for the input and output coupling devices, but this is only an example. As will be appreciated any appropriate device may be utilised. For example, FIG. 2 shows a waveguide system in which diffraction gratings 20, 21 are utilised to provide the input and output coupling devices. Although any input and output coupling structure may be utilised the devices must be matched to preserve the optical quality of the far field. For example, different wavelengths of light may diverge while passing through the input coupling device 13/20, which divergence must be corrected at the output coupling device 15/21. Devices 13, 15, 20, 21 have been shown as transmissive components, but reflective components of the same type could also be utilised.

To allow for flexibility in the alignment of the user's eye with the device the output pupil should be large. For example, an exit pupil of greater than 12 mm diameter may be desirable.

However, the exit pupil has to be located at the eye, and therefore has to be illuminated by rays that are arranged to intersect that particular area, which is remote from the waveguide and from the input optics 12. Furthermore the exit pupil must be illuminated by the whole of the far field. In order to achieve this without a waveguide the ray paths from the input optics 12 have to illuminate most of the area of the exit pupil from every angle in the far field. Hence the input optics 12 would have to be very large and heavy because they are some distance away from the exit pupil.

A waveguide may be utilised to translate rays from the input optics 12 until they are projected onto the exit pupil; and the ray paths are divided up into multiple paths that can intersect the exit pupil. This is achieved without unduly changing the far field.

This invention may be applied to the design of waveguides that are similar but have different trade-offs in the design aspects. Some waveguides will be designed to produce a large exit pupil through multiple replications of the input pupil, which may be typically 30 mm across. This makes the device usable when the observer's eye is less constrained to be aligned with the waveguide. Other waveguides will be designed with less pupil replication, leading to a smaller exit pupil and brighter display, but one that is harder to use. Other waveguides will have a small exit pupil and the observer's eye will be constrained, so that stray light paths that escape from the waveguide are arranged to miss the eye so that they are not visible The waveguide system may therefore be designed to expand the near field such that the output pupil is larger than the input pupil. This expansion is commonly known as pupil replication. This is achieved by dividing the light beam into many components that only partially overlap in order to increase the size of the near field, without degrading the far field of the beam (i.e. ray directions are preserved). Pupil expansion should be achieved without disturbing the light luminance over the near field. Variations in luminance across the near field appear as changes in image brightness as the user's eye moves across the output pupil This expansion may be achieved utilising a diffractive or semi-reflecting structure in, or on the surfaces of, waveguide 10. In the example of FIG. 1 a semi-reflecting surface 16 is provided through the waveguide. The semi-reflecting surface splits the light into two directions, the main ray 17a and a second ray 17 only shown partially. Ray 17 propagates to the output pupil in the same way as described for ray 17a but is offset in the view of FIG. 1. If the semi-reflecting surface 16 has a 50% reflectivity rays 17a and 17 will be of equal power.

Achieving the required optical performance with reflective and refractive structures can be difficult because these mechanisms produce sharp boundaries in pupil illumination giving uneven near field distribution of light leading to pupil banding in the image visible to the user.

In the example of FIG. 2, the diffraction grating 20 deviates light into a diffracted order. That diffraction occurs at different ray angles within the waveguide that are dependent on the wavelength of the light that is diffracted. The resultant dispersion of ray angles causes a widely dispersed far field whose ray angles are strongly influenced by the wavelength of the light.

The ray angles define the far field light pattern and contain the image bearing information in the display system.

Grating 21 is arranged to have the opposite effect of grating 20, so that the widely dispersed colours within the waveguide are recombined. The information content of the far field is therefore reconstructed with minimal residual colour dependent dispersion.

Within the waveguide the paths taken by rays 17 and 17a are substantially different for different wavelengths and therefore reconstruct the near field with blurred boundaries. A holographic waveguide is therefore preferable to a prismatic waveguide in this respect. However, the wide dispersion of light within the waveguide causes limitations on how much colour or how much variation in ray angles can be transmitted through the waveguide. The product of wavelength range with ray angles is generally referred to as bandwidth. A prismatic waveguide is may be preferable to a holographic waveguide in this respect.

In the example of FIG. 2, a semi-reflecting surface 22 is used to divide the ray paths 14a up into multiple paths 17 and 17a, thus enabling the replication and expansion of the pupil of input optics 12.

Semi-reflecting surfaces 16 and 22 may be provided by forming the waveguide 10 from two pieces of material. The semi-reflecting surface is formed on one piece of the material and the two pieces are bonded together such that the surface are within the resulting waveguide as shown in FIGS. 1 and 2. Alternatively the diffraction grating may be positioned on the outer surfaces of the waveguide. The beam is trapped by total internal reflection, but the field of the beam interacts with the grating on the surface leading to diffraction. A single diffracted ray (order) is shown in FIG. 2, but multiple orders of diffraction may be created, each at a different angle.

The design shown in FIG. 2 may be changed by the removal of diffraction gratings 20 and 21; and by changing semi-reflecting surface 22 into a partially transmitting and partially reflecting diffraction grating. In this configuration, the grating properties may be arranged such that some light that is diffracted and spread into many directions dependent on its wavelength, may be diffracted back such that the initial wavelength spreading is compensated and the full image bearing information is restored. The restored light would have ray angles that are able to leave the waveguide and traverse to the eye. The action of the grating would also leave some light within the waveguide that is not compensated, but which is arranged to be travelling in directions with angles greater than the critical angle of the material, and thus will be trapped in the waveguide 10 by total internal reflection.

The proportion of light energy that is split into each diffracted order by a diffraction grating is called the diffraction efficiency. In order to achieve reasonable diffraction efficiency, and to reduce ghost ray paths associated with unwanted diffraction orders, the diffraction grating fringes are usually shaped with a profile approximating to a triangular cross section, giving a saw tooth profile to the grating. Such gratings are commonly known as blazed gratings. The pitch of suitable diffraction gratings is typically approximately 0.5 microns, at which scales blazed gratings are difficult and expensive to fabricate with the required performance.

Blazed gratings tend to be expensive because their designers are attempting to diffract the majority of the light into one order. By relaxing this condition, gratings may be made less expensive and of higher quality. An alternative to blazed gratings are square wave gratings, where the fringe profile takes a square or rectangular shape. These diffract light into more than one order. This description utilises the term 'square wave' grating to describe gratings whose fringe profiles are formed by generally rectangular sections of material that are deposited on a substrate. They have the common feature of being designed to diffract light into more than one direction and may be extended in form to a generally rectangular shaped material, or ones in which multiple layers of different shapes are deposited on top of each other, and ones in which the composite shapes start to approximate to a blazed profile. Other photolithographic methods may extend the choice of profiles that are shaped like sine functions, or combinations of sine functions. The generic difference to blazed gratings is that the deliberate diffraction into more than one order is being incorporated into the waveguide design.

It is desirable to replicate the pupil in 2 dimensions. However, the mechanisms described above with reference to FIGS. 1 and 2 only replicate the pupil in one dimension (laterally across the page, not in the axis perpendicular to the page). The input pupil thus has to be the size of the exit pupil in the unreplicated direction, which is at right angles to the plane containing FIG. 1 and FIG. 2. Replication in the $2^{nd}$ perpendicular direction can be achieved in a holographic waveguide using multiple diffraction gratings arranged at angles to one another. Forming such gratings is difficult and expensive.

An aspect of the invention is that two waveguide components are aligned together, such that each is substantially 1 Dimensional, but they are orientated at substantially orthogonal directions such that the Pupil Replication occurs in 2 directions. The result is a waveguide that is compact like a 1 Dimensional waveguide, but expands the pupil in 2 dimensions.

A further constraint on waveguide design is that the range of ray angles within the waveguide are limited to lie between three conditions:
1) The ray angles have to be sufficiently large to exhibit Total Internal Reflection (TIR) so that light is contained within the waveguide.
2) In the case of a Holographic Waveguide, the ray angles have to be small enough to couple with the diffraction gratings, since larger angles are not compatible with the diffraction physics.
3) In the case of a Prismatic Waveguide, the ray angles must be small enough to reflect multiple times within the waveguide.

The range of angles is the difference between the upper limit on the size of the ray angles described in 2) or 3) less the lower limit to the ray angle described in 1). This range of angles, when multiplied by the refractive index of the waveguide material, contributes towards the bandwidth of the waveguide. Bandwidth is also limited by the action of the diffraction gratings in spreading ray angles over a range of values dependent on the wavelength of the light, such that the angle limitations in 1) and 2) above cause variations in colour rendition across the far field. Hence bandwidth serves to limit the field of view to lie within boundaries There is a requirement for a waveguide system to provide pupil replication.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical waveguide system for a head up display, the system comprising first and second optical waveguides mounted such that the inner and outer faces of each of the first and second waveguides are all parallel; the first optical waveguide comprising a first diffraction grating, and the second optical waveguide comprising a second diffraction grating wherein the first and second gratings are arranged to be at right angles to each other; an input region of the first waveguide arranged such that light can be projected into the first waveguide within an input angle range to strike the first diffraction grating without passing through the second diffraction grating, wherein the first diffraction grating diffracts a portion of light trapped in the first waveguide by total internal reflection to an angle at which the diffracted light is not trapped by total internal reflection and at which the diffracted light propagates out of the first waveguide to strike the second diffraction grating, and an output region of the first or second waveguide arranged such that light trapped in the first or second waveguide by total internal reflection and which strikes the first or second grating is diffracted into the input angle range to exit the optical waveguide assembly to an exit pupil without striking the other of the first or second grating.

The output region may be formed in the first waveguide in the direction of propagation of light in the first waveguide from the input region.

The output region may be formed in the second waveguide perpendicular to a direction of propagation of light in the first waveguide from the input region.

The first and/or second grating may diffract reflectively.

The first and/or second grating may diffract in transmission.

The first and second gratings may be arranged to be at right angles to each other.

The first and/or second diffraction gratings may be coated with a reflective coating to preferentially reflect light that is not trapped by total internal reflection.

The first and/or second grating profiles may be formed by a rectangular profiled material that has a low area of phase and an area of high optical phase, the said areas being rectangular in shape.

The grating profiles may be made from overlapping layers of rectangular profiled material that combine to create a more complex phase profile.

The overlapping rectangular fringe profiles may be arranged to be approximately the shape of a blazed grating.

BRIEF DESCRIPTION OF THE DRAWINGS

Embodiments of the invention will be described, by way of example, with reference to the following drawings, in which.

DETAILED DESCRIPTION

Figure 1:
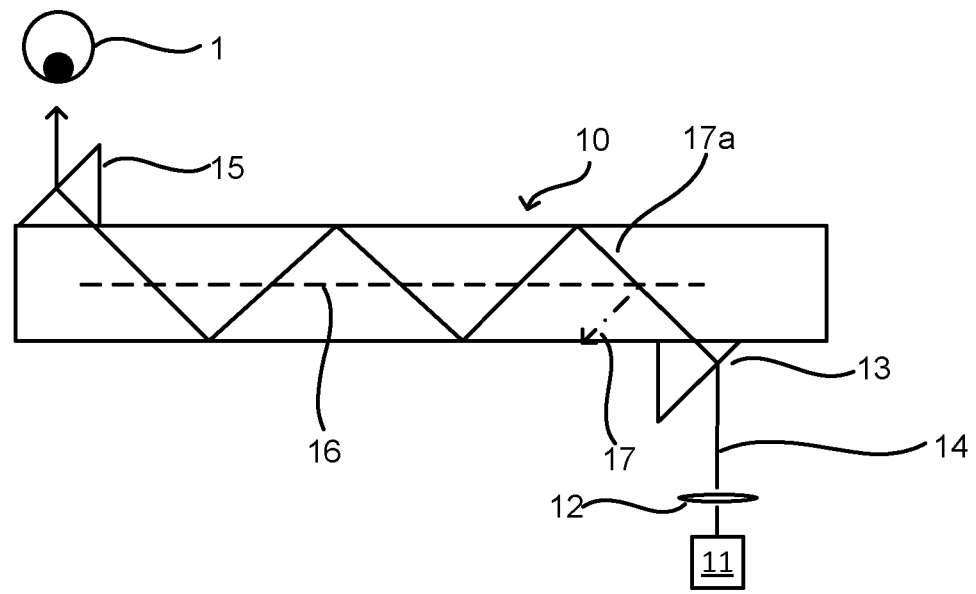
FIG. 1 shows a cross-section of a prismatic waveguide structure.
Figure 2:
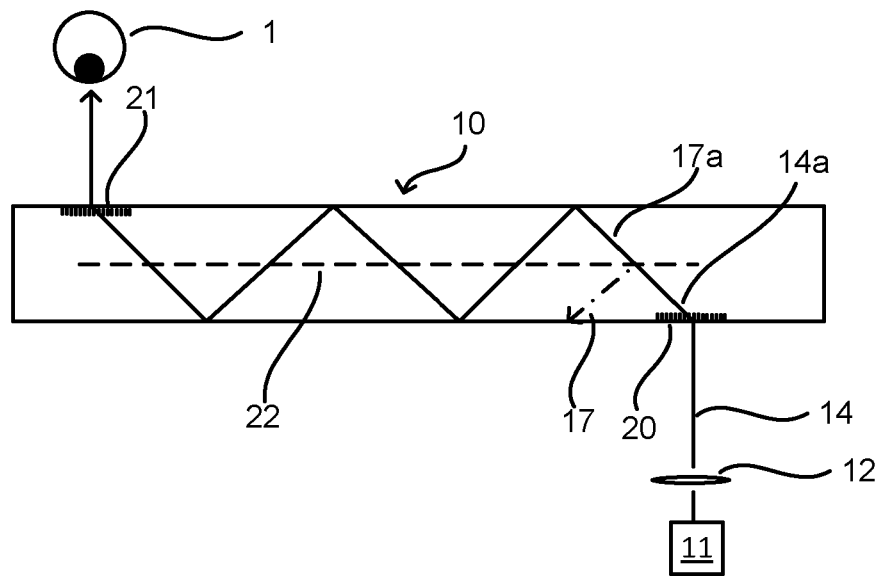
FIG. 2 shows a cross-section of a holographic waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 3:
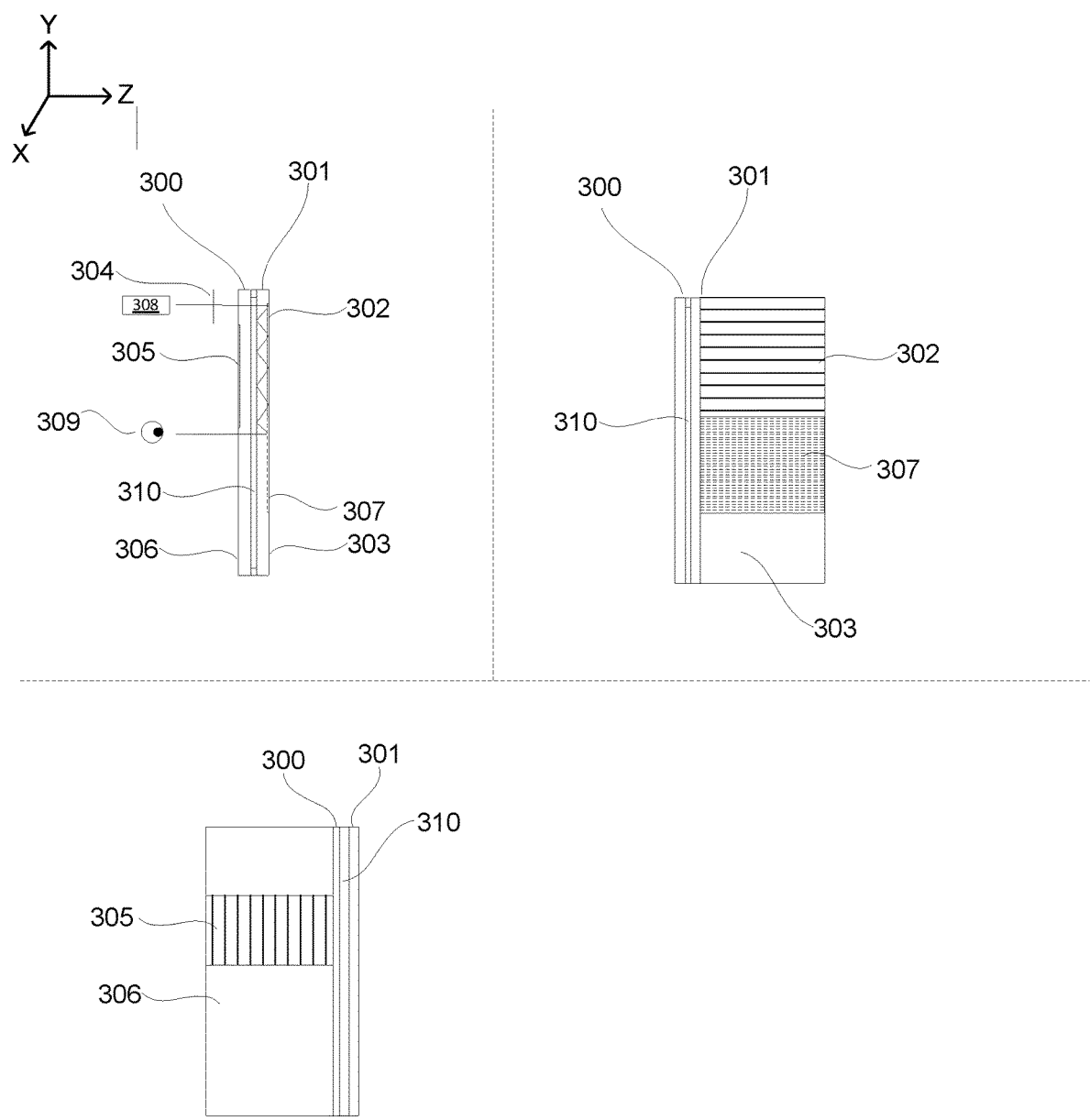
FIG. 3 shows cross-section and perspective views of a dual waveguide system.

FIG. 3 shows a schematic cross-section and perspective views of a waveguide system for a head up display which utilises simple diffractive gratings to replicate the input pupil. The gratings may be formed by photolithography.

The waveguide system is formed of two parallel waveguides 300, 301 separated by an air gap 310. Spacers are provided to hold the waveguides 300, 301 the required distance apart. The waveguides 300, 301 may be bonded to separate spacers or the spacers may be formed on one of the waveguides using a photolithographic process. Any suitable mechanism for holding the waveguides in the required configuration may be utilised.

Waveguide 301 is provided with grating 302 on the outside face 303 of the waveguide 301. Grating 302 forms an input coupling component to diffract light injected through the input pupil 304 at an injection angle such that it is trapped by total internal reflection in waveguide 301.

The lines of grating 302 are aligned with the X-axis shown in the figures which will be termed a horizontal direction. Light striking the grating 302 is diffracted in a downwards direction generally aligned with the Y-axis (vertical direction) and is trapped within the waveguide 301 by total internal reflection. The mathematics of diffraction off grating 302 add a component to the ray vectors that is parallel to the Y-axis.

Waveguide 300 is provided with a grating 305 on its outside face 306. The lines of grating 305 are oriented with the Y-axis shown in the figures such that light striking the face 306 is reflected and diffracted generally in the direction of the X-axis through the addition to the mathematics describing the ray of a component parallel to the X-axis.

Grating 302 extends down the face 303 towards an output region 307. In that output region the grating 302 may be modified to reduce its diffraction efficiency (for example by varying the depth of the grating) as will be explained in more detail below.

As grating 302 is extended, the pitch of the grating remains the same. For that reason, the diffraction angle and the spreading of colours of light remain the same. Therefore, the combination of diffraction events, in a particular light path that reaches the observer's eye, compensate the colour spreading no matter which part of grating 302 they interact with. But the amount of light diffracted by the grating is altered by changing the depth of the grating profile.

This is demonstrated by a mathematical analysis that is well known to one skilled in the art, and which is used to estimate the efficiency by which a diffraction grating diffracts light into different orders. From a simplified analysis of a square wave phase grating the following equation applies:

Diffraction efficiency into zero order=$\cos^2 (\Delta\varnothing)$

Diffraction efficiency into +/−1 orders=$[(2/pi)\cdot\sin (\Delta\varnothing)]^2$ Where $\Delta\varnothing$ is the change in optical phase caused by the rectangular depth of material deposited on the substrate, as one half of the profile of a grating fringe.

Conditional assumptions apply to these equations, for example the grating is produced by coating a substrate with transparent material over one half of the width of a fringe, that the width of the coated surface equals the width of the uncoated surface, and the depth of the profile is small compared to the width of the fringes. But the equations they serve to indicate the principle that the amount of flux diffracted by the grating depends on the depth of the deposited material.

A projector 308 is arranged to project an image into the input pupil 304. The image is guided and expanded by the waveguide system to exit pupil 309 at which a user can view the image. As has been explained above, at the entrance and exit pupils the far field is focussed at a long distance, effectively infinity, such that the user can view the image overlaid on the real world without having to refocus. Ray direction is preserved between the input and exit pupils to preserve image quality. In an example, the entrance pupil is 8 mm×12 mm with a field of view of 30 degrees×20 degrees. Grating 302 extends further towards the top of the waveguide than grating 305 such that light from projector 308 does not interact with grating 305 before striking grating 302.

The combination of gratings 302, 305 provide pupil expansion in 2 dimensions. Gratings which are simpler to fabricate than blazed gratings, such as rectangular profile gratings formed with photolithography, may be utilised to reduce the difficulties of fabrication.

The function of the waveguide system shown in FIG. 3 will now be described with reference to the series of FIGS. 4(a)-(f). Each of the figures shows a section of a ray's path from a projector to an exit pupil through the waveguide system of FIG. 3. The total ray path has been divided into sections to allow a clearer description of that path and the operation of the system.

Figure 4:
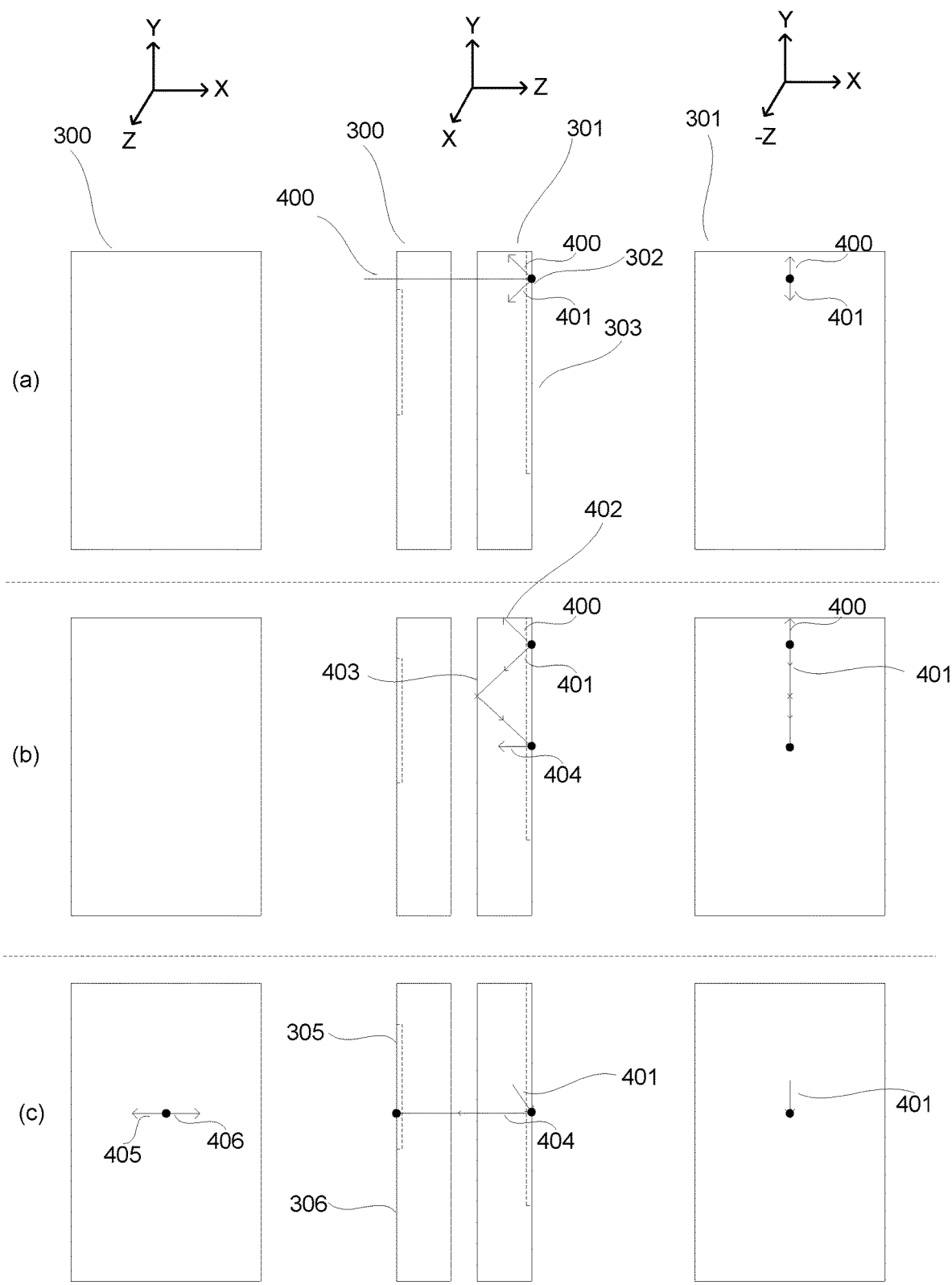
FIG. 4 shows a sequence of figures showing the propagation of a ray through the waveguide system of FIG. 3.
Figure 4:
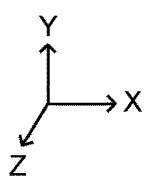
Figure 4:
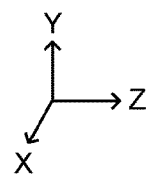
Figure 4:
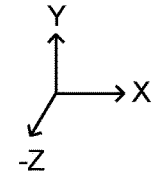
Figure 4:
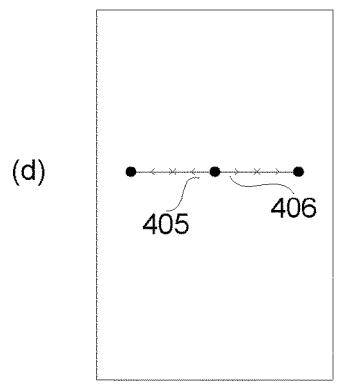
Figure 4:
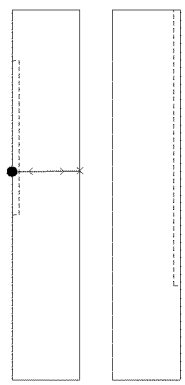
Figure 4:
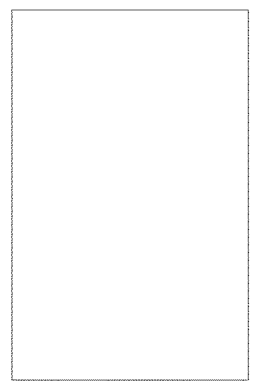
Figure 4:
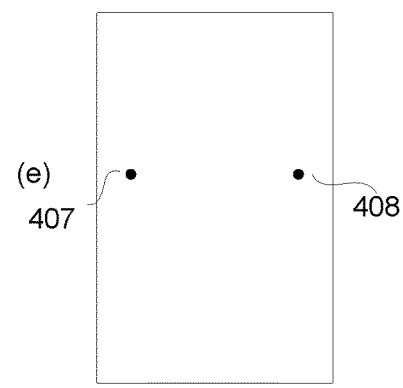
Figure 4:
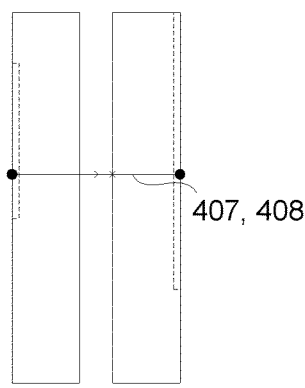
Figure 4:
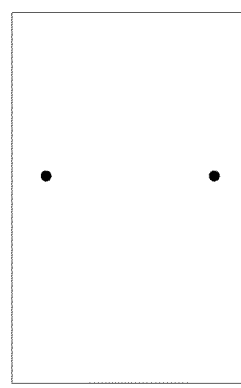
Figure 4:
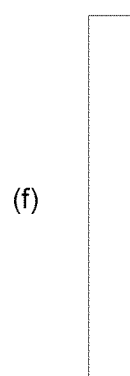
Figure 4:
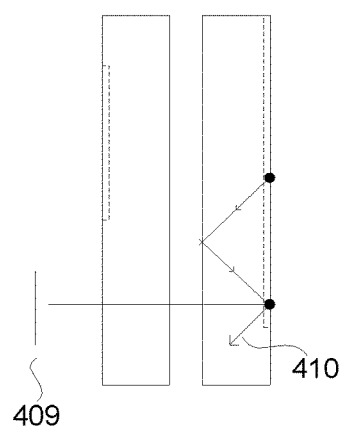
Figure 4:
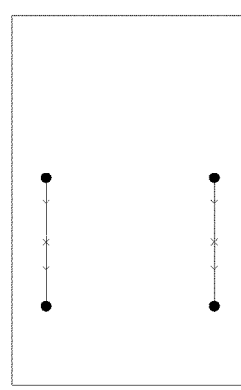

FIG. 4 is arranged in three columns, relating to the axis orientation shown at the top of each column. The left column show a plan view looking at the outside face 306 of waveguide 300, the central column is a side-view of the two waveguides 300, 301 and the right column is a plan view looking at face 303 of waveguide 301. For clarity reference numerals for common parts will not be repeated between figures.

Also for ease of understanding, in the left and right columns only rays in the waveguide closest to the viewpoint are.

Interaction (reflection, transmission or diffraction) of a ray with an outside face 303, 306 is shown by a dot, and interaction with an inside face of the waveguides is shown by a cross.

A single ray is shown in the figures for clarity, but as will be appreciated this represents a bundle of rays at different angles (each angle representing a pixel of the image) and a spatial distribution of parallel rays across the input and exit pupils Ray 400 is directed from a projector into the input pupil of the waveguide system.

Due to the angle of projection the ray 400 passes through waveguide 300 and into waveguide 301 without significant reflection. At the outside face 303 of waveguide 301 the ray interacts with grating 302 and is diffracted into rays 400, 401. Only the first order diffraction order is shown in FIG. 4. Rays from higher orders of diffraction will also be produced, but are likely to be at significantly reduced amplitudes compared to the first order rays. Those rays will behave in generally the same manner as the description herein for the first order diffraction.

Moving to FIG. 4(b) diffracted ray 400 is absorbed by the end-face 402 of waveguide 301.

The grating 302 is designed such that the first and higher order diffraction is at an angle that is trapped in the waveguide 301 by total internal reflection. The ray 401 is thus reflected at face 403 by total internal reflection and propagates back to the outside face 303 where it re-interacts with grating 302.

Part of the light energy defined by ray 401 is diffracted by grating 302 into ray 404. Since ray 404 is interacting with the same grating for a second time, the first order diffraction is into the same angle as input ray 400. The angle is arranged so that the chromatic dispersion of the ray angles caused by diffraction is compensated by the combined action of grating 302 at the intersection of rays 400 and 401; and the intersection of rays 401 and 404. The rule that achieves this compensation is that ray 404 must either be angled relative to the input ray 400 as though it is reflected by a mirror, or if grating 302 transmits light as described in other embodiments below, then ray 404 must be angled relative to the input ray 400 as though it is transmitted through a plane window.

Due the angle of the ray 404 it is no longer trapped in the second waveguide 301 and thus escapes to enter waveguide 300 as per FIG. 4(c). Ray 404 then interacts with grating 305 at surface 306. Grating 305 is vertical, with lines in the Y-axis, such that ray 403 is diffracted into two first order rays 405 and 406.

As per the trapping of ray 401 in waveguide 301, rays 405 and 406 propagate at an angle which traps those rays by total internal reflection in waveguide 300. The rays thus reflect from the inner surface of waveguide 300 and propagate back to the outer surface 306 where they re-interact with grating 305. As can be seen in FIGS. 4(d) and (e) the ray has been shifted in the X-axis, and replicated in two directions. As set out above, the ray shown in FIG. 4 represents a bundle of rays covering the full field of view of the projector and the spatial area of the input pupil. The replication of the ray thus represents replication of the whole input pupil in the horizontal direction, thus expanding that pupil.

The area of overlap between the gratings 302, 305 may be considered an optical cavity in which the rays propagate and the pupil is expanded.

When rays 405 and 406 re-interact with grating 305 they are coupled back to their original angle on entering waveguide 300 and are thus no longer constrained by total internal reflection. The rays thus exit waveguide 300 and re-enter waveguide 301 (FIG. 4(e)). The rays 407, 408 are parallel to the ray 400 and thus the far field information has been preserved. The process described above then continues a predetermined number of times as the rays propagate downwards in the Y-axis in waveguide 301, and are replicated horizontally in waveguide 300. The scale of FIG. 4 has been exaggerated and in fact the rays traverse a smaller distance between interactions with the surfaces such that they interact with each grating a number of times.

The interaction between the rays and the grating 302 in the region of the input section of grating 302 indicated by the interaction of ray 401 in FIG. 4(a); and in the region of grating 302 that is opposite the grating 305; may be made more efficient by coating the grating with a reflective material such as silver. Likewise reflections of diffraction from grating 305 may be made more efficient. This is because a portion of the light will be diffracted by the gratings into the zero orders, one of which is transmitted and lost to a stray light path. The silvering will reflect this light into a reflected zero order where it may be usefully recycled by further interactions with gratings 302 and 305. The extension of grating 302 into the region near to the Exit Pupil 309 and eye is deliberately made less efficient to graduate the rate at which light energy leaves the waveguide towards the eye.

In output region 307 the efficiency of grating 302 is reduced such that a portion of the light is diffracted as explained above, and a portion of the light is transmitted out of the waveguide to exit pupil 409 where the image is presented to a user with their eye located at the exit pupil. Light 410 diffracted by grating 302 continues downwards as described above and upon re-interaction with the output region part will again transition out to the output pupil. The pupil is thus replicated in the vertical direction.

The combination of replication by grating 305 and output region 307 provides 2 dimensional pupil expansion between the input pupil 304 and output pupil 409. Ray direction is maintained throughout that replication and so the far field content of the light from the projection system is maintained at the output pupil, thus maintaining image quality. As mentioned above, far field image quality is only maintained if the rays that are replicated traverse the directions that they would if they were reflected by a plane mirror or transmitted by a plane parallel window.

If the combination of waveguides are arranged so as to reflect light to the Exit Pupil 309 & 409, then one axis of the image orientation will be reversed. This is well understood by one skilled in the art and requires compensation either by reversing an axis in the device producing the image by electronic means, or by arranging compensating alignments in the optics of projector 308.

As can be seen from the example ray of FIG. 4 only a portion of the input light is directed towards the exit pupil at each interaction with the diffraction gratings. Light diffracted in other directions may either be absorbed by absorbent coatings on the side faces of the waveguides 300, 301, or may be redirected towards the output pupil at a subsequent interaction with the diffraction gratings.

The gratings 302 and 305 will diffract the rays and replicate the pupil in each of four directions. Since only one of these directions reaches the exit pupil the optical efficiency is reduced. However, part of the loss may be recovered by designing a smaller field of view and a smaller exit pupil 309, such that the light flux is spread over an effectively smaller Etendue.

The overall efficiency of the waveguide system is lower due to input and output coupling losses, attenuation during transmission, and reflection losses.

In order improve the optical efficiency, the gratings can be partially blazed, while still retaining the ability to utilise low-cost fabrication methods such as photolithography. The directionality of blazed gratings improves the portion of light directed in the required direction, hence improving efficiency.

The inside faces of the waveguides 300, 301 may be coated with a partially reflective coating such that only a portion of the light is transmitted from the second waveguide to the first waveguide, and vice-versa. The reflected portion of the light continues to propagate, but is offset from the incident ray thus providing further pupil replication. Since the ray angles are not affected the image quality is preserved.

As noted above the waveguide system does not use blazed gratings, but rather is designed to operate with gratings that can be formed efficiently using a photolithography process. For example, a binary square wave grating may be utilised. Such gratings diffract light into multiple orders and in conventional designs those higher orders may degrade image quality. However, in the waveguide system described herein, the higher order rays are trapped in either the first or second waveguide 300, 301 by total internal reflection. At subsequent interactions the rays may then be coupled back to the original directions and ultimately exit through the exit pupil, or they are absorbed by absorbent coatings on the sides of the waveguides 300, 301. Furthermore the output region and exit pupil are arranged such that ray angles resulting from higher order diffraction do not pass through the exit pupil at angle that is visible to the eye. The image quality is therefore not degraded by the higher orders of diffraction resulting from the use of simpler to manufacture gratings.

As an example of a suppressed stray light path, the input image typified by ray 400 will contain image information spread over a range of angles. This range of angles may be sufficiently great that the TIR condition partially breaks down, and light leaks out of the waveguide after it has been diffracted by a first grating but before it is diffracted by a second grating; and therefore the stray light is heavily perverted by chromatic dispersion. But this stray light is also exiting the waveguide at a large angle such that the ray geometry may be arranged to miss the exit pupil 309, 409 and not be seen by the observer.

In an example waveguide system, each waveguide may have a surface area of 40×46 mm. The optical cavity area, in which the two gratings 302, 305 overlap may have a length of 18 mm, and cover the width of the waveguides. The output region may occupy the width of the waveguide 302 and have a vertical length of 20 mm. A waveguide with these dimensions may be utilised to provide an output pupil of 12×20 mm.

As noted above the gratings of the waveguide system are preferably manufactured using a low-cost technique such as photolithography. Such techniques are particularly suited to binary gratings, but many other profiles can also be approximately formed by overlaying layers. For example, approximations to sinusoidal or symmetrical triangle gratings may be utilized. A degree of blazing may also be possible.

Examples of manufacturing methods include gratings with multiple layers, where photolithography is used to reproduce more than one layer in a stack. Each layer is characterised by a profile that causes a phase change in the light irradiating the grating, the said profile being composed of a repetitive pattern. The fringe spacing is the distance over which the profile repeats its shape. Within that shape, there are generally areas that have no material deposited and others which do have material. Photolithographic techniques generally produce an equal deposited thickness over those areas that have deposited material. If the deposited width is the same as the width that is clear of deposited material, then the term 'square wave grating' generally describes the detail of the grating. However, the term also effectively describes a rectangular profile where the deposited material is a different width from the clear area. Additional structures may be produced by depositing multiple gratings over each other, in which the width of the deposited material changes with different layers, and generally reduces in width as more layers are added, but not necessarily. This method may be used to approximately deposit a blazed grating, but not with the full effect. Therefore the gratings produced by photolithographic methods will exhibit diffraction into more than one order, such that a significant amount of light is diffracted in opposing directions.

Grating profiles similar to a sinusoidal depth profile can be produced by exposing a light sensitive layer with an interference pattern produced by holographic methods, where the light sensitive layer is selected to have a variable response to its exposure to light.

FIGS. 5 to 8 show four example configurations applying the principles described above in relation to FIGS. 3 and 4. In each of the configurations, a first grating diffracts light into a primary waveguide, which acts as part of an optical cavity, and is extended to provide an output grating; and second grating in a secondary waveguide acts to spread the light in the orthogonal direction to the direction of propagation from the input pupil to the exit pupil. The grating in the primary waveguide may be arranged to work in transmission or reflection; and likewise the grating in the secondary waveguide may be transmitting or reflecting.

Figure 5:
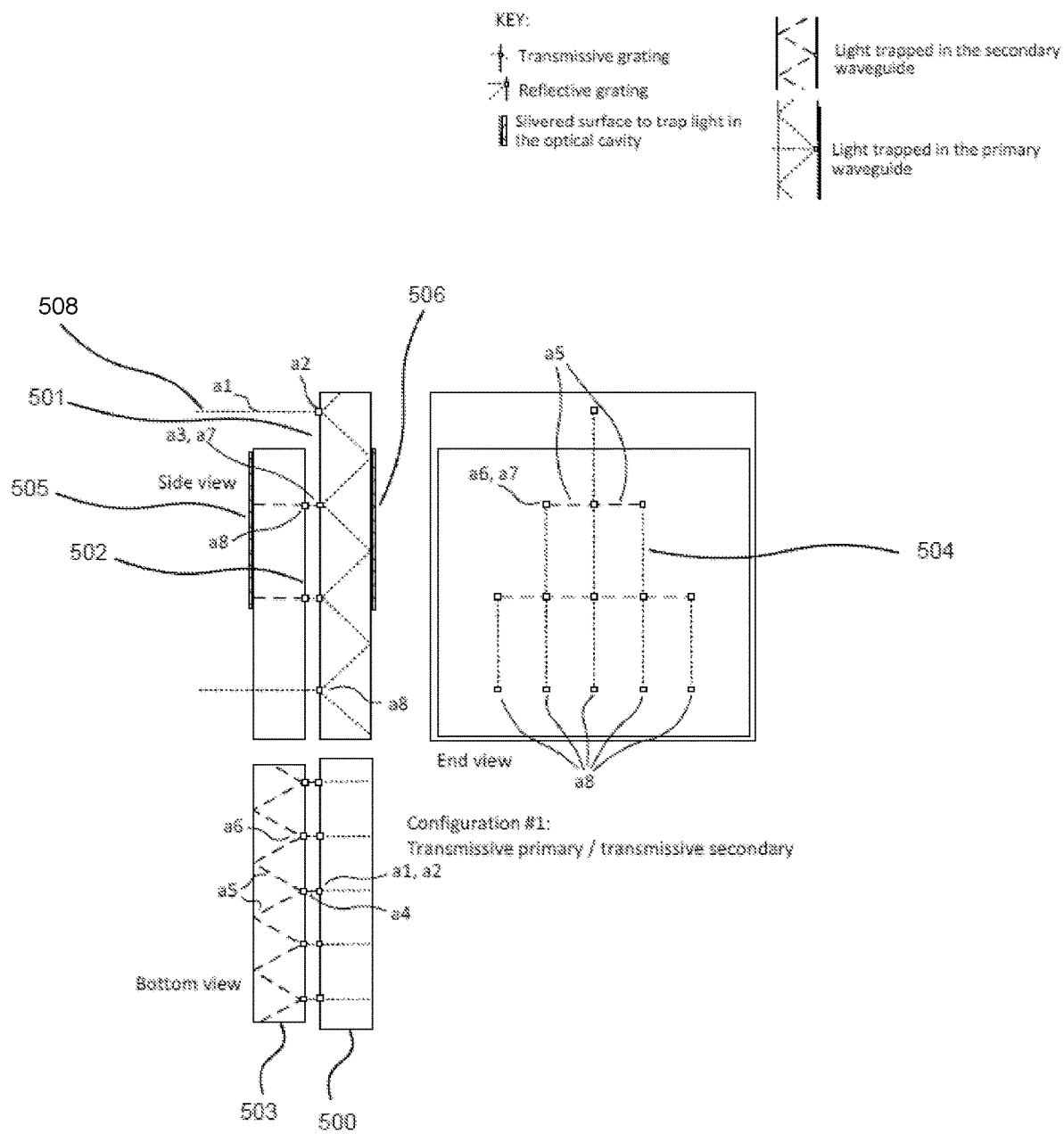
FIGS. 5 to 8 show views of a dual waveguide system.

In the example of FIG. 5 light 508 enters the primary waveguide 500 at a1 and is diffracted by the primary grating 501 at a2. The resulting rays are trapped in the primary waveguide 500 by Total Internal Reflection (TIR). Because the condition for TIR is for rays to be diffracted at greater angles than can be generated in air, ghost reflections from the grating are suppressed. This suppression occurs at all of the diffraction occurrences noted on FIG. 5 where the light is incident from air onto the grating 501. At location a3 part of the light is diffracted back out of the primary waveguide 500 and is diffracted by secondary grating 502 at a4 into the secondary waveguide 503. This second grating also works by transmitting the diffracted light.

The light diffracted into the secondary waveguide is trapped by TIR. The direction of diffraction is shown by the two rays a5. When the trapped light re-interacts with the secondary grating at a6, part of it is diffracted back into the primary waveguide. At point a7 part of the light is diffracted as rays 504, and part of the light (not shown) is transmitted undeviated through a7 into the primary waveguide.

The outer face of primary waveguide 500 (and the outer face of secondary waveguide 503) is coated with a reflective coating 505, 506 (for example, silver) to reflect this otherwise wasted light back onto the gratings, where it may be recycled into useful ray paths. The wanted ray paths re-interact with the two gratings multiple times so as to produce the expanded ray trace shown in the 'End view'. For clarity, not all the useful ray paths are shown in this view, just enough to illustrate the method by which the pupil is expanded in the horizontal direction.

As light propagates beyond the reflective regions of the outer faces (which form the optical cavity) light diffracted by the primary grating (for example at a8) is diffracted out of the device and to the exit pupil. Light not diffracted out of the primary waveguide 500 by primary grating 501 continues propagating and a further portion is diffracted to the exit pupil as subsequent interactions with primary waveguide 501 to expand the pupil in the vertical direction of FIG. 5.

Figure 6:
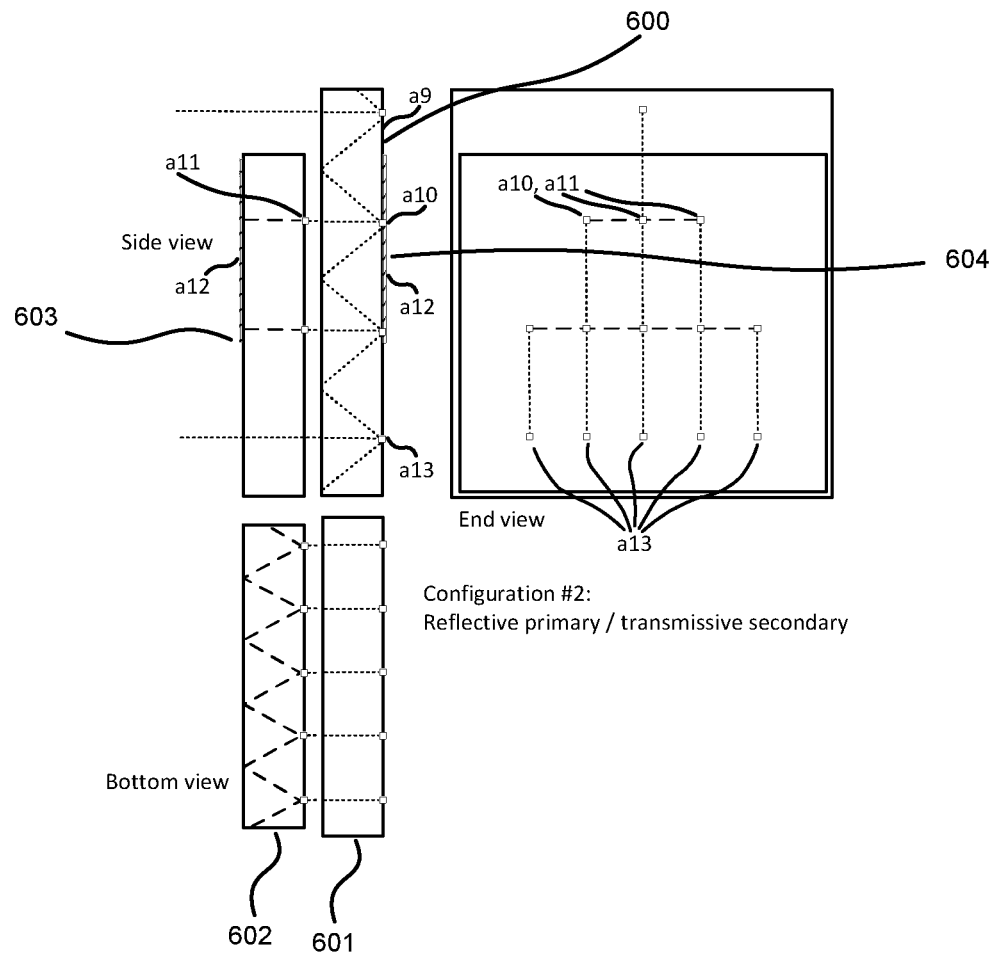

FIG. 6 shows an example in which the primary grating 600 is positioned on the outer face of primary waveguide 601 and operates in reflection to diffract light propagating towards the outer face back into the waveguide. An initial interaction at a9 diffracts light to be trapped by TIR in the primary waveguide 601. When the rays re-interact with the primary waveguide at a10, the reflective diffraction process at a10 reflects light back out of the primary waveguide to the secondary waveguide diffraction grating at all. The secondary waveguide 602 causes the same ray paths as are described above. Upon exiting the secondary waveguide, the light intersects the primary waveguide grating that diffracts it back into the primary waveguide such that it is trapped by TIR. Some light will diffract in the wrong direction or be coupled into the zero order reflection.

The outer surfaces of the optical waveguides 601, 602 a12 have a reflective coating 603, 604 (for example silver) to reflect zero order light back into the optical waveguides where it may be recycled. Light that is trapped by TIR traverses the primary waveguide 601 until it interacts with the output grating which is an extension of the primary grating 600; which diffracts part of the light at a13. Multiple occurrences of interaction a13 cause pupil replication in the vertical direction of FIG. 6. Multiple occurrences of the diffraction process at all cause pupil replication in the horizontal direction of FIG. 6.

Figure 7:
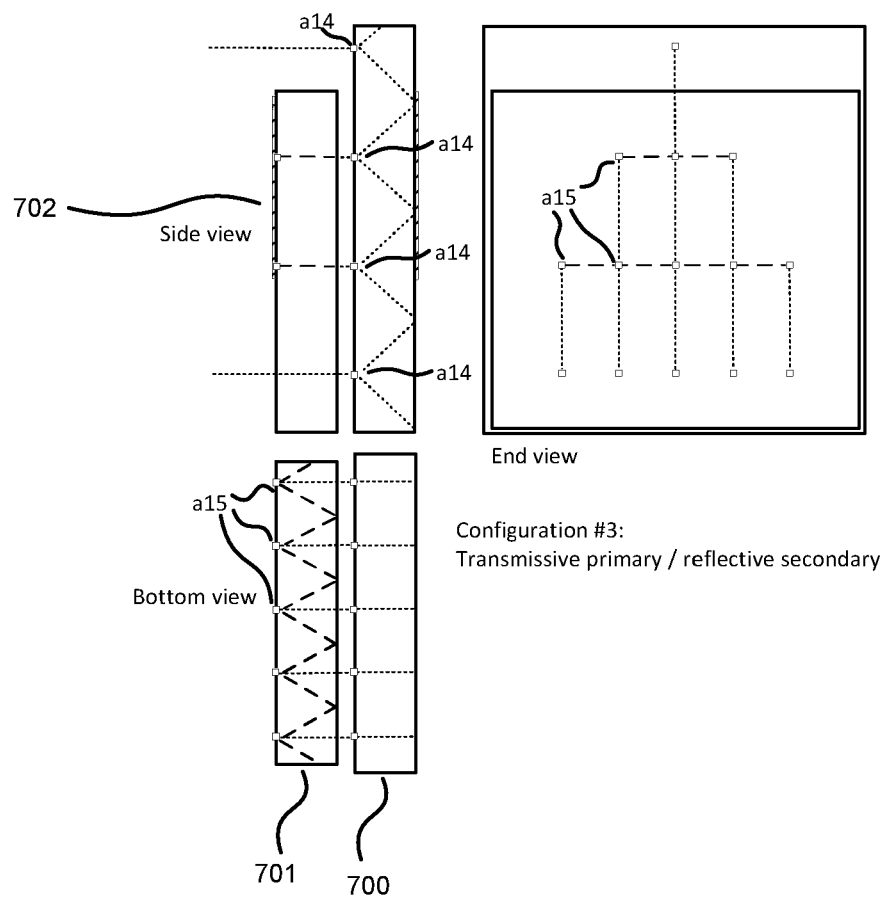

In the example of FIG. 7 the primary waveguide 700 works as described above in relation to FIG. 5. Interactions of light at a14 diffract the light into the secondary waveguide 701. Secondary waveguide 701 has a reflective secondary grating 702 on the outer face, which diffracts light into reflective orders at a15, which deviate the light such that it is trapped by TIR within the secondary waveguide. The light re-interacts with the secondary grating at a15 and some is diffracted back into the primary waveguide. Multiple interactions at a15 cause pupil replication in the horizontal direction of FIG. 7.

Figure 8:
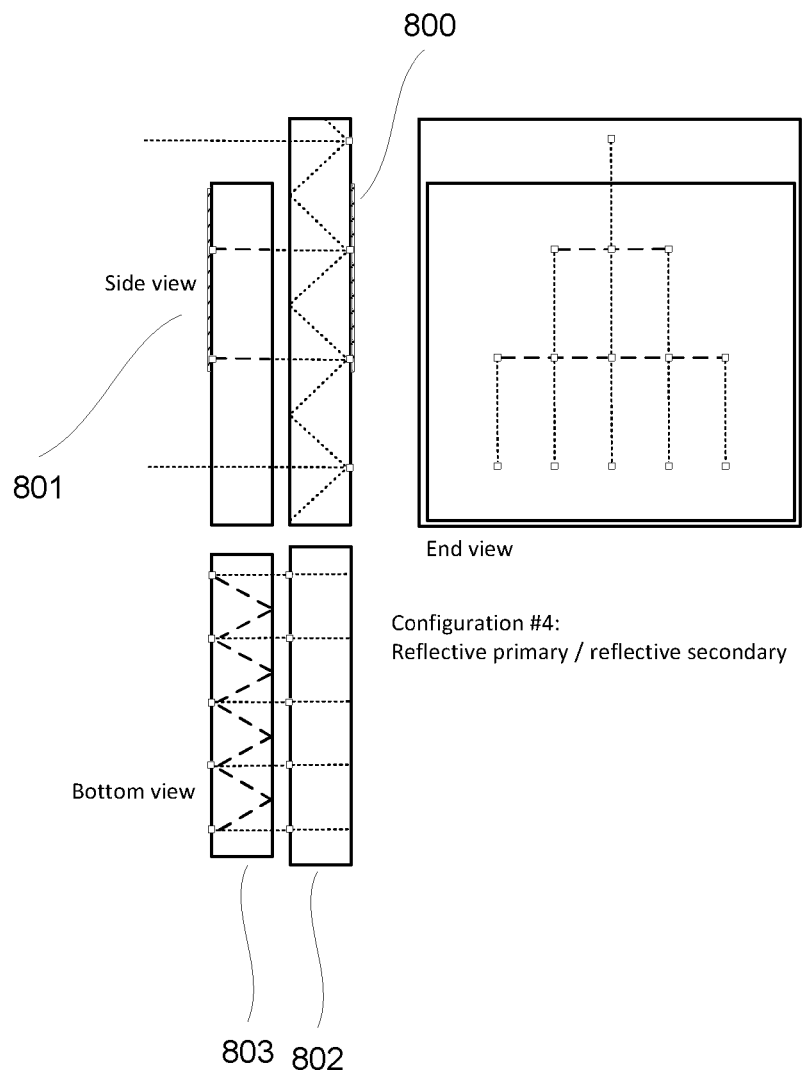
Figure 9:
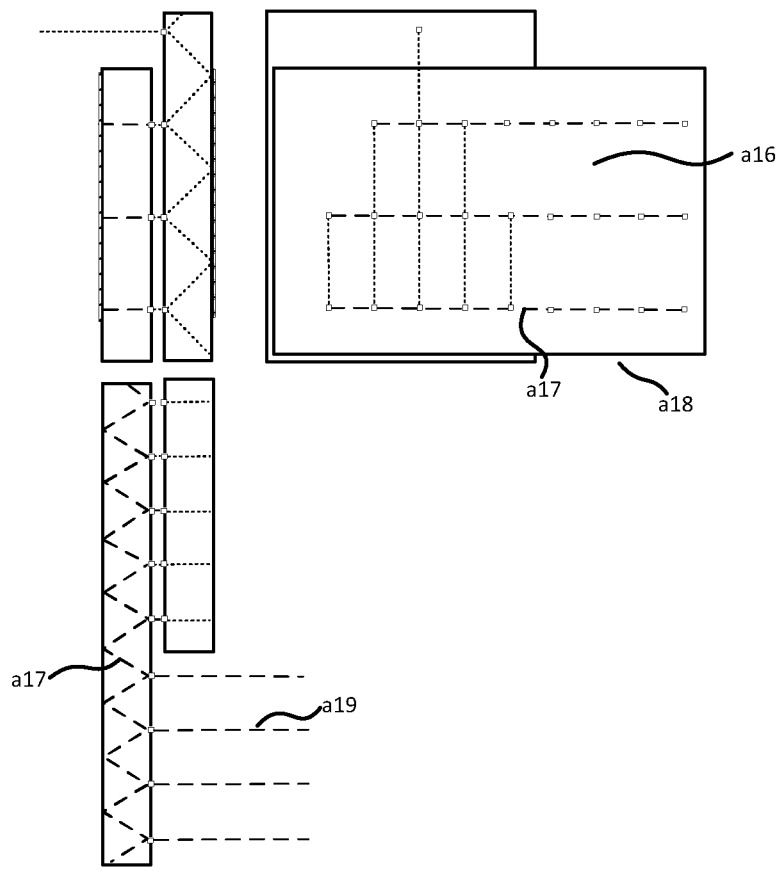
FIGS. 9 to 12 show views of a dual waveguide system with an extended second waveguide.
Figure 10:
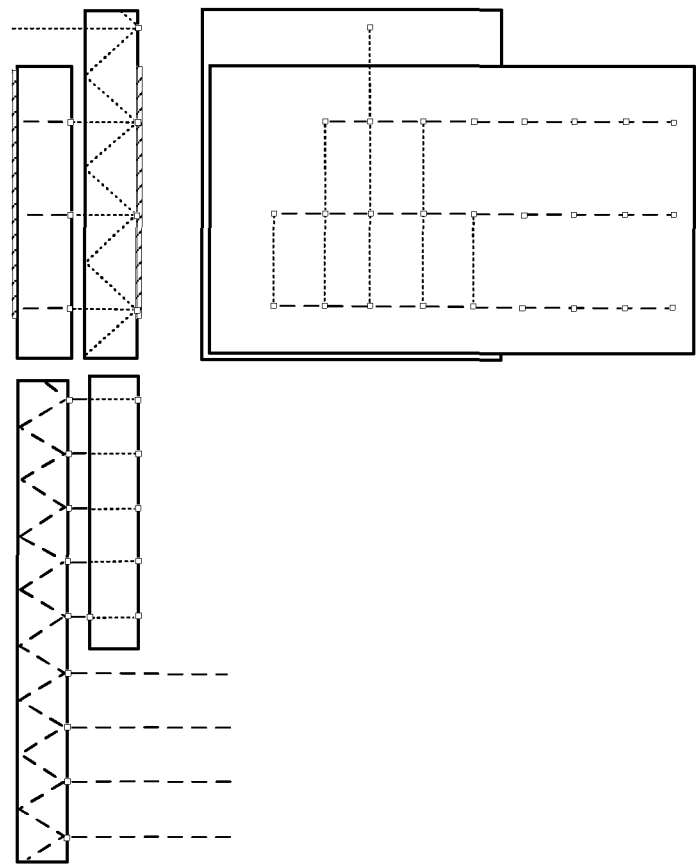
Figure 11:
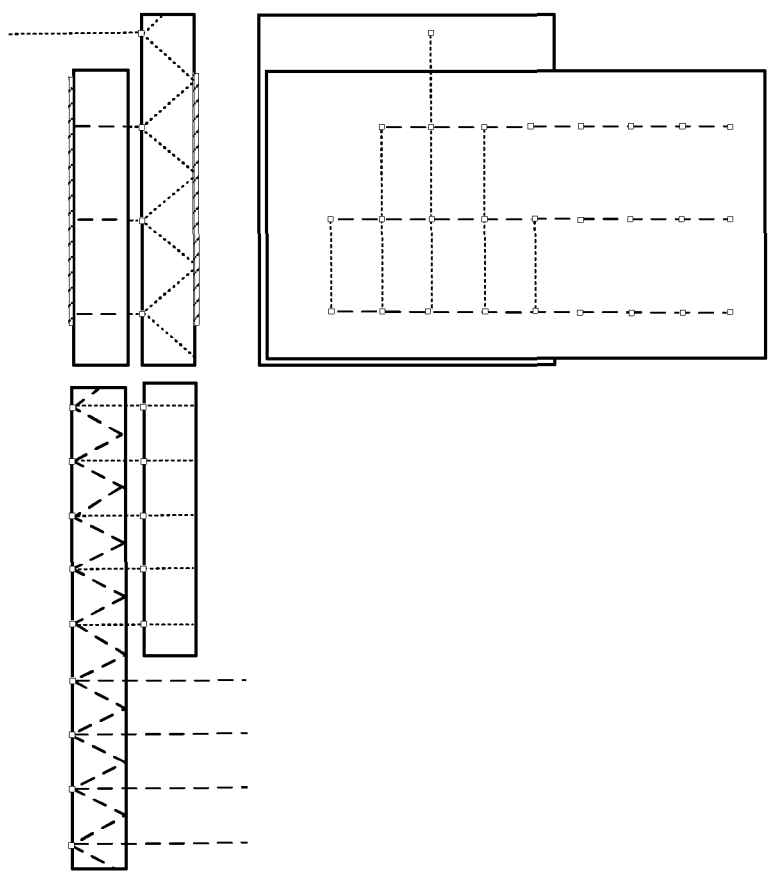
Figure 12:
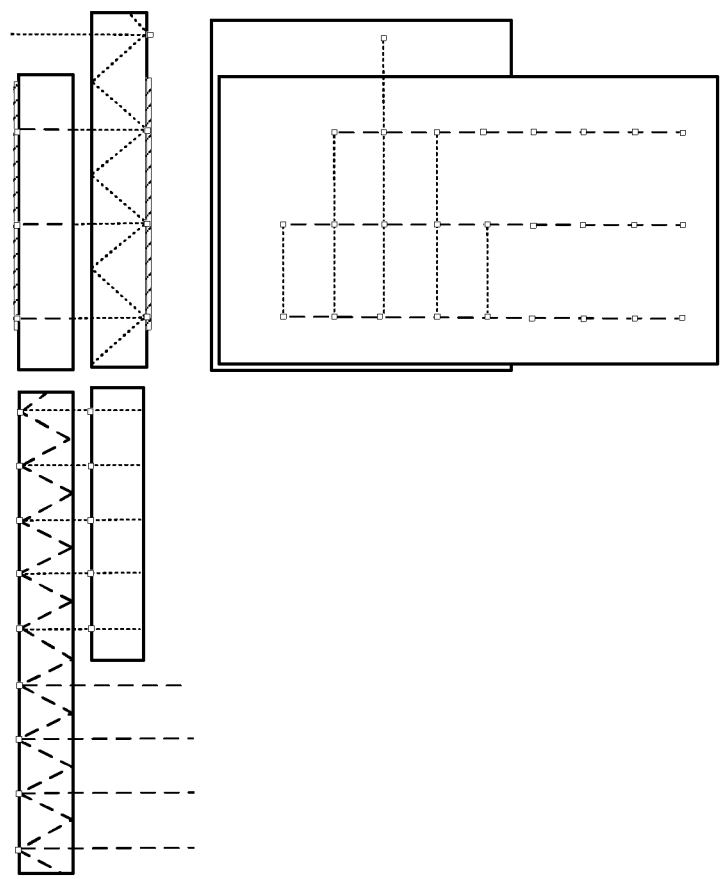

In the example of FIG. 8 both the primary 800 and secondary 801 gratings are located on the outer faces of the primary 802 and secondary 803 waveguides both gratings work in the reflective mode.

Further variations may be made by rotating the secondary grating such that it is contained within the planes shown in the diagram, but is no longer at right angles to the primary grating. This may have the advantage that it creates a further pupil replication in the vertical direction.

FIGS. 9-12 show alternative configurations of the examples shown in FIGS. 5-8. In these examples the secondary waveguide 900 is extended to be wider than the primary waveguide 901. The amplitude of the grating profile is varied to create a partially transmitting or partially reflecting region at the output region a16. The ray paths are as described before, and follow the same pattern of transmitting and reflecting grating combinations. Except that the light that is trapped in the secondary waveguide a17 is allowed to traverse to an output region of the secondary waveguide a16, which is created by the extension of the width of the said waveguide a18.

Because the secondary waveguide grating is extended, it is natural for a transmitting secondary waveguide grating to diffract transmitted light in the output region; and likewise the reflective secondary waveguide grating naturally diffracts light into a reflected direction in the output region; and thus it is normal for the output light to traverse in the same direction as the input light a19; i.e., from left to right in the diagram.

Although the present invention has been described in connection with some embodiment, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide system to be used in a head-up display, the optical waveguide system comprising:
a first optical waveguide and a second optical waveguide assembled such that inner faces and outer faces of each of the first optical waveguide and the second optical waveguide are substantially parallel to one another, the first optical waveguide having a first diffraction grating coupled thereto and the second optical waveguide having a second diffraction grating coupled thereto, the first diffraction grating and the second diffraction grating being arranged in directions such that the gratings are not at right angles to each other, the first diffraction grating and the second diffraction grating further being arranged to partially overlap each other such that an input region of the first optical waveguide is arranged such that light projected into the first optical waveguide within an input-angle range substantially strikes the first diffraction grating without passing through the second diffraction grating, an area of the partial overlap between the first diffraction grating and the second diffraction grating being further arranged such that the first diffraction grating diffracts a portion of light trapped in the first optical waveguide to an angle at which the diffracted light propagates out of the first optical waveguide to strike the second diffraction grating, the second diffraction grating being configured to diffract a portion of light trapped in the second optical waveguide to an angle at which the diffracted light is to propagate out of the second optical waveguide to re-enter the first optical waveguide and strike the first diffraction grating.

2. The optical waveguide system of claim 1, wherein at least one of an output region of the first optical waveguide and the second optical waveguide is arranged such that light trapped in at least one of the first optical waveguide and the second optical waveguide by total internal reflection that strikes at least one of the first diffraction grating and the second diffraction grating is to be diffracted into the input angle range to exit the optical waveguide system to an exit pupil substantially without striking the other of the first diffraction grating and the second diffraction grating.

3. The optical waveguide system of claim 1, wherein at least one of the first diffraction gratings and the second diffraction grating is configured to diffract reflectively.

4. The optical waveguide system of claim 1, wherein at least one of the first diffraction grating and the second diffraction grating is configured to diffract in transmission.

5. The optical waveguide system of claim 1, wherein at least one of the first diffraction grating and the second diffraction grating is coated with a reflective coating to preferentially reflect light that is not trapped by total internal reflection.

6. The optical waveguide system of claim 1, wherein at least one of the first diffraction grating and the second diffraction grating comprise overlapping layers of profiled material that are configured to combine to produce a phase profile.

7. The optical waveguide system of claim 6, wherein the overlapping layers are arranged to approximate a blazed grating shape.

8. The optical waveguide system of claim 6, wherein the overlapping layers are formed as a rectangular profiled material.

9. An optical waveguide system, comprising:
a first optical waveguide and a second optical waveguide arranged substantially parallel to one another, the first optical waveguide having a first diffraction grating and the second optical waveguide having a second diffraction grating, the first diffraction grating and the second diffraction gratings being arranged in directions such that the gratings are not at right angles to each other, the first diffraction grating and the second diffraction grating further being arranged to partially overlap each other, the optical waveguide system configured such that light projected into the first optical waveguide within an input-angle range substantially strikes the first diffraction grating without passing through the second diffraction grating, an area of overlap between the first diffraction grating and the second diffraction grating being arranged such that the first diffraction grating diffracts a portion of light trapped in the first optical waveguide to an angle at which the diffracted light propagates out of the first optical waveguide to strike the second diffraction grating, the second diffraction grating being configured to diffract a portion of light trapped in the second optical waveguide to an angle at which the diffracted light is to propagate out of the second optical waveguide to re-enter the first optical waveguide and strike the first diffraction grating.

10. The optical waveguide system of claim 9, wherein at least one of an output region of the first optical waveguide and the second optical waveguide is arranged such that light trapped in at least one of the first optical waveguide and the second optical waveguide by total internal reflection that strikes at least one of the first diffraction grating and the second diffraction grating is to be diffracted into the input angle range to exit the optical waveguide system to an exit pupil substantially without striking the other of the first diffraction grating and the second diffraction grating.

11. The optical waveguide system of claim 9, wherein light trapped in at least one of the first optical waveguide and the second optical waveguide that strikes at least one of the first diffraction grating and the second diffraction grating is to be diffracted to exit the optical waveguide system via an exit pupil without further striking the other of the first diffraction grating and the second diffraction grating.

12. The optical waveguide system of claim 9, wherein an output region of the first optical waveguide is configured to be oriented in a direction of propagation of light in the first optical waveguide with respect to an input region of the first optical waveguide.

13. The optical waveguide system of claim 9, wherein at least one of the first diffraction gratings and the second diffraction grating is configured to diffract reflectively.

14. The optical waveguide system of claim 9, wherein at least one of the first diffraction grating and the second diffraction grating is configured to diffract in transmission.

15. The optical waveguide system of claim 9, wherein at least one of the first diffraction grating and the second diffraction grating is coated with a reflective coating to preferentially reflect light that is not trapped by total internal reflection.

16. The optical waveguide system of claim 9, wherein at least one of the first diffraction grating and the second diffraction grating comprise overlapping layers of profiled material that are configured to combine to produce a phase profile.

17. The optical waveguide system of claim 16, wherein the overlapping layers are arranged to approximate a blazed grating shape.

18. A head-up display, comprising:
a projector configured to project light, and
an optical waveguide system configured to receive the light from the projector, the optical waveguide system comprising:
a first optical waveguide and a second optical waveguide arranged substantially parallel to one another, the first optical waveguide having a first diffraction grating and the second optical waveguide having a second diffraction grating, the first diffraction grating and the second diffraction gratings being arranged in directions such that the gratings are not at right angles to each other, the first diffraction grating and the second diffraction grating further being arranged to partially overlap each other, the optical waveguide system configured such that light projected into the first optical waveguide within an input-angle range substantially strikes the first diffraction grating without passing through the second diffraction grating, an area of overlap between the first diffraction grating and the second diffraction grating being arranged such that the first diffraction grating diffracts a portion of light trapped in the first optical waveguide to an angle at which the diffracted light propagates out of the first optical waveguide to strike the second diffraction grating, the second diffraction grating being configured to diffract a portion of light trapped in the second optical waveguide to an angle at which the diffracted light is to propagate out of the second optical waveguide to re-enter the first optical waveguide and strike the first diffraction grating.

19. The head-up display of claim 18, wherein first optical waveguide and the second optical waveguide are separated by an airgap.

* * * * *